US009815445B2

(12) United States Patent
Cann

(10) Patent No.: US 9,815,445 B2
(45) Date of Patent: Nov. 14, 2017

(54) BRAKE BOOSTER ASSEMBLY

(71) Applicant: BWI (SHANGHAI) CO., LTD., Shanghai (CN)

(72) Inventor: Barton Cann, South Lyon, MI (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 61 days.

(21) Appl. No.: 14/925,559

(22) Filed: Oct. 28, 2015

(65) Prior Publication Data
US 2016/0121869 A1 May 5, 2016

Related U.S. Application Data

(60) Provisional application No. 62/069,985, filed on Oct. 29, 2014.

(51) Int. Cl.
*F16D 65/28* (2006.01)
*B60T 13/74* (2006.01)
(Continued)

(52) U.S. Cl.
CPC ............ *B60T 13/746* (2013.01); *B60T 7/042* (2013.01); *B60T 7/107* (2013.01); *B60T 11/18* (2013.01);
(Continued)

(58) Field of Classification Search
CPC ...... B60T 13/746; B60T 13/745; B60T 11/04; B60T 11/18; B60T 7/04; B60T 7/042; B60T 7/107; F16D 66/00; F16D 2066/003
(Continued)

(56) References Cited

U.S. PATENT DOCUMENTS 2,871,827 A 2/1959 Euga
4,224,832 A 9/1980 Prohaska et al.
(Continued)

FOREIGN PATENT DOCUMENTS

CN 101327788 A 12/2008
CN 102205838 A 10/2011
(Continued)

OTHER PUBLICATIONS

F. Bucchi et al., A fail safe magnetorheological clutch excited by permanent magnets for the disengagement of automotive auxiliaries, Journal of Intelligent Material Systems and Structures 2014, vol. 25 (16), published Jan. 13, 2014.
(Continued)

*Primary Examiner* — Pamela Rodriguez
(74) *Attorney, Agent, or Firm* — William H. Honaker; Dickinson Wright PLLC

(57) ABSTRACT

A brake booster assembly and method of operation thereof are provided. The assembly includes a rack moveable along a first axis. A sensor is coupled with the rack for sensing force and displacement of the rack and outputting a proportional signal. A clutch subassembly is disposed adjacent and coupled to the rack and includes a drum and a hub in a spaced relationship with the drum. A motor is disposed adjacent the rack and coupled to the clutch subassembly for rotating the drum. A magnetorheological fluid is disposed between the drum and the hub. An electromagnet is disposed about the clutch subassembly for generating an electromagnetic field to affect the viscosity of the magnetorheological fluid. A controller is electrically connected to the electromagnet and to the sensor and to the motor for controlling the motor and the electromagnetic field of the electromagnet in response to the signal from the sensor.

19 Claims, 4 Drawing Sheets

(51) Int. Cl.
   *B60T 7/04*     (2006.01)
   *B60T 7/10*     (2006.01)
   *B60T 11/18*    (2006.01)
   *F16D 66/00*    (2006.01)

(52) U.S. Cl.
   CPC ........ *F16D 66/00* (2013.01); *F16D 2066/003* (2013.01)

(58) Field of Classification Search
   USPC .......... 188/156, 157–160, 161, 162; 60/545, 60/551, 552, 594; 303/113.3, 113.4, 303/114.1
   See application file for complete search history.

(56) References Cited

U.S. PATENT DOCUMENTS

| | | | |
|---|---|---|---|
| 4,395,883 | A | 8/1983 | Melinat |
| 4,531,419 | A | 7/1985 | Bötz et al. |
| 4,918,921 | A | 4/1990 | Leigh-Monstevens et al. |
| 5,022,950 | A | 6/1991 | Ingalls et al. |
| 5,224,410 | A | 7/1993 | Graichen et al. |
| 5,236,257 | A | 8/1993 | Monzaki et al. |
| 5,779,013 | A | 7/1998 | Bansbach |
| 5,788,341 | A | 8/1998 | Penrod et al. |
| 5,927,825 | A | 7/1999 | Schenk et al. |
| 6,047,546 | A | 4/2000 | Takeyama |
| 6,220,675 | B1 | 4/2001 | Steffes |
| 6,230,492 | B1 | 5/2001 | Kingston et al. |
| 6,574,959 | B2 | 6/2003 | Fulks et al. |
| 6,634,724 | B2 | 10/2003 | Kobayashi et al. |
| 7,070,032 | B2 | 7/2006 | Weilant |
| 8,157,333 | B2 | 4/2012 | Arakawa |
| 8,157,689 | B2 | 4/2012 | Steinwender et al. |
| 8,459,753 | B2 | 6/2013 | Vollert et al. |
| 8,468,820 | B2 | 6/2013 | Drumm |
| 8,783,792 | B2 | 7/2014 | Vollert et al. |
| 2010/0126167 | A1 | 5/2010 | Nagel et al. |
| 2010/0176653 | A1 | 7/2010 | Arakawa |
| 2011/0297493 | A1 | 12/2011 | Vollert et al. |
| 2012/0192556 | A1 | 8/2012 | Verhagen et al. |
| 2013/0239567 | A1 | 9/2013 | Ohnishi et al. |
| 2013/0298550 | A1 | 11/2013 | Leiber et al. |
| 2016/0264117 | A1* | 9/2016 | Deng ................. B60T 11/18 |

FOREIGN PATENT DOCUMENTS

| | | |
|---|---|---|
| CN | 103108785 A | 5/2013 |
| DE | 3031643 C2 | 7/1993 |
| EP | 0456770 A1 | 11/1991 |
| KR | 1019980030367 A | 6/1999 |
| KR | 1019970006001 A | 8/2002 |
| WO | 2005070738 A1 | 8/2005 |

OTHER PUBLICATIONS

International Search Report, dated Jan. 13, 2016; 12 pages.

* cited by examiner

BRAKE BOOSTER ASSEMBLY

CROSS REFERENCE TO RELATED APPLICATIONS

This application claims the benefit of U.S. Provisional Application No. 62/069,985 filed Oct. 29, 2014, which is incorporated herein by reference in its entirety.

BACKGROUND OF THE INVENTION

1. Field of the Invention

A brake booster assembly for providing an assistive force in a braking system.

2. Description of the Prior Art

Brake booster assemblies of the type to which the subject invention pertains generally attach to a brake pedal and to a master cylinder for providing a force that is combined with a force applied through the brake pedal to actuate the brakes with the master cylinder. In other words, the brake booster assembly provides an assist to the input force of the master cylinder beyond that provided by a driver's effort in pushing the brake pedal. Many brake booster assemblies use a hollow housing and at least one diaphragm to create pressure chambers within the housing. The pressure chambers are connected to a vacuum source (e.g. an engine intake) using control valves. The diaphragm is attached to a piston which is coupled to the master cylinder and the vacuum pressure provides an assistive force to the input force of the master cylinder as the brake pedal is depressed.

However, smaller engines, supercharging, and emissions requirements in modern vehicles greatly reduce the available vacuum pressure, which necessitates the use of vacuum pumps. Additionally, hybrid and completely electric vehicles may not provide vacuum pressure at all times, or at all. Furthermore, conventional booster assemblies can increase the weight of vehicles due to their complexity and use of large components. Therefore, there remains a significant need for a solution providing an assistive force in a braking system with fewer parts and which may be used on vehicles with little or no available vacuum pressure.

SUMMARY AND ADVANTAGES OF THE INVENTION

The invention provides for such a brake booster assembly including a rack moveable along a first axis. At least one sensor is coupled with the rack for sensing force and axial displacement of the rack and outputting a signal proportional to the sensed force and the sensed displacement. A clutch subassembly is disposed adjacent and coupled to the rack and includes a drum and a hub in a spaced relationship with the drum. A motor is disposed adjacent the rack and coupled to the clutch subassembly for rotating the drum. A magnetorheological fluid is disposed between the drum and the hub. An electromagnet is disposed about the clutch subassembly for generating an electromagnetic field to affect the viscosity of the magnetorheological fluid. A controller is electrically connected to the electromagnet and to the sensor and to the motor for controlling the motor and the electromagnetic field of the electromagnet in response to the signal from the sensor.

The invention also provides for a brake booster assembly including a rack moveable along a first axis and having a plurality of rack teeth extending from the rack. At least one sensor is coupled with the rack for sensing force and axial displacement of the rack and outputting a signal proportional to the sensed force and the sensed displacement. A clutch subassembly is disposed adjacent the rack and includes a drum and a hub. The drum of the clutch assembly has an outside surface defining a plurality of drum teeth extending radially from the outside surface. The hub includes a sleeve that has an exterior defining a plurality of hub teeth extending radially and meshed with the rack teeth for moving the rack along the first axis in response to rotation of the hub. A motor is disposed adjacent the rack and is coupled to a pinion gear having a plurality of pinion teeth meshed with the drum teeth for rotating the drum. A controller is electrically connected to the sensor and to the motor and operably connected to the clutch subassembly for controlling movement of the rack in response to the signal from the sensor.

Additionally, the invention provides for a method of operating a brake booster assembly including the steps of depressing a brake pedal and moving and applying a force to a pedal linkage in response to movement of the brake pedal. The method proceeds by sensing displacement and force corresponding to the movement of the pedal linkage with a sensor. Next, outputting a signal proportional to the sensed displacement and force with the sensor and driving a motor in response to the signal from the sensor. The next steps of the method are rotating a drum of a clutch with the motor and transmitting torque selectively from the drum to a hub of the clutch. The method concludes by moving a rack and a push rod axially in response to rotation of the hub.

Thus, several advantages of one or more aspects of the brake booster assembly are that it may be used for vehicles with smaller engines, diesel engines, supercharged engines, as well as with hybrid or electric vehicles. The brake booster assembly also reduces overall vehicle weight since it may be used in place of considerably larger and more complex vacuum pressure based brake boosters. Due to the use of a clutch subassembly including a magnetorheological fluid, the brake booster assembly can still operate if there is a loss of electrical power and force applied through the brake pedal will be applied to the master cylinder unlike "brake-by-wire" systems.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a brake booster assembly 20 is generally shown for providing an assist to the input force to a brake master cylinder 22 beyond that provided by a driver's effort in depressing a brake pedal 24. Although the preferred embodiment of the invention is intended to be used for ground vehicles, it should be appreciated that the disclosed brake booster assembly 20 may be used for many other applications such as, but not limited to use in other brake systems or where it is desired to boost or assist a rectilinear force input to a system.

Figure 1:
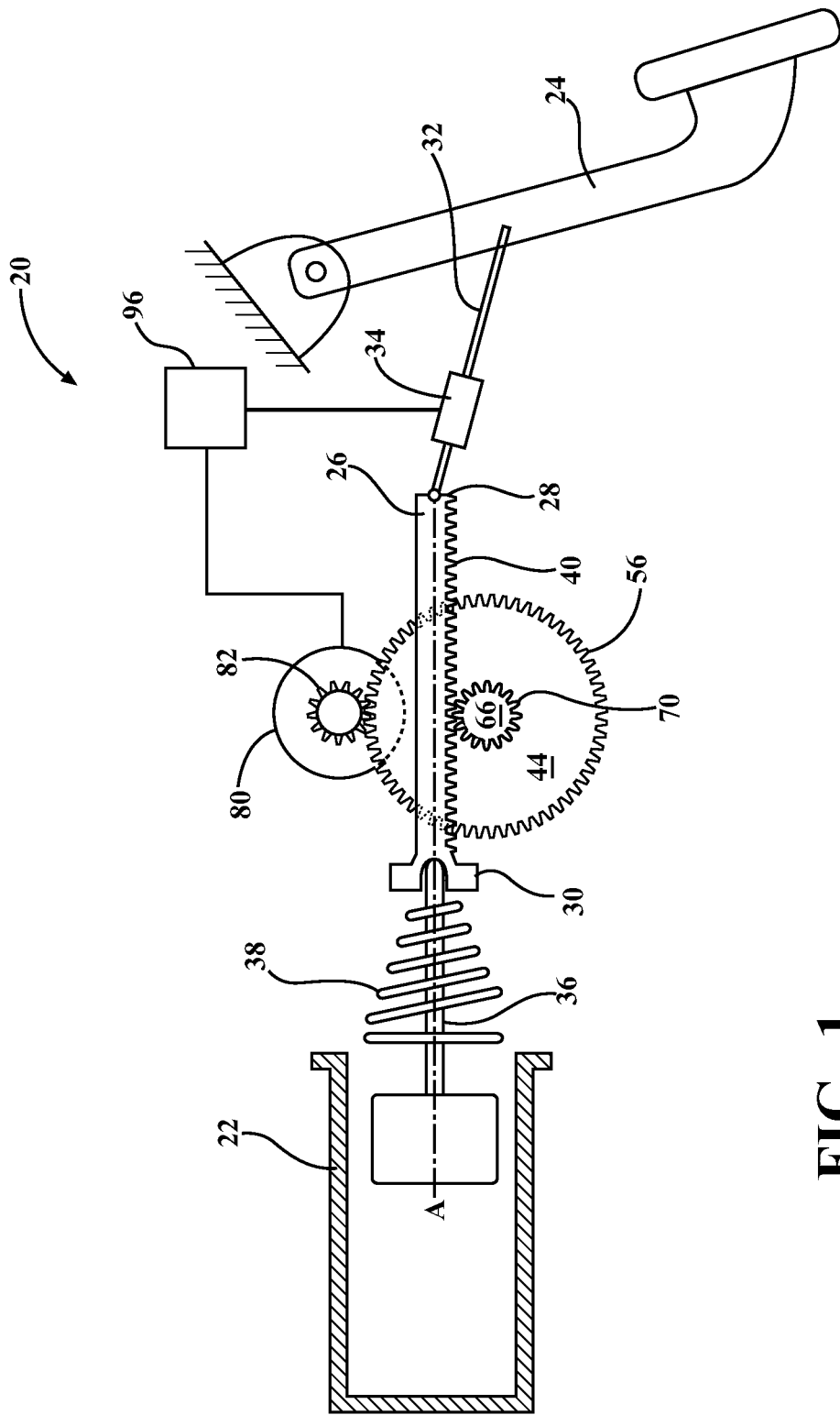
FIG. 1 is a perspective view of a brake booster assembly.

As best shown in FIG. 1, the brake booster assembly 20 includes a rack 26 moveable and extending along a first axis A. The rack 26 includes a first end 28 and a second end 30 and an external surface. A pedal linkage 32 is attached to and extends axially from the first end 28 of the rack 26 for connection to a brake pedal 24. At least one sensor 34 is attached to the pedal linkage 32 for sensing force and axial displacement of the pedal linkage 32 and outputs a signal proportional to the sensed force and the sensed displacement. Although the sensor 34 of the preferred embodiment senses changes in displacement and force or strain, it should be appreciated that the brake booster assembly 20 may be configured to include or use other sensors 34 or sense various other associated mechanical or electrical characteristics while operating. A push rod 36 is attached to and extends axially from the second end 30 of the rack 26 for connection to a master cylinder 22. A return spring 38 is annularly disposed about the push rod 36 and extends axially between the master cylinder 22 and the second end 30 of the rack 26 for applying a force against the rack 26 toward the pedal linkage 32 (i.e. resists movement of the rack 26 toward the master cylinder 22). The rack 26 also includes a plurality of rack teeth 40 extending radially from the external surface and disposed along the rack 26 from the first end 28 to the second end 30.

A clutch subassembly 42, generally indicated, is disposed adjacent to the rack 26 and includes a drum 44 and a hub 46. The drum 44 of the clutch has a cup shape and includes a lip 48 and an outside surface 50 and an inside surface 52. The drum 44 is disposed about and extends along a second axis B transverse to the first axis A and is rotatable about the second axis B. The drum 44 defines an opening 54 disposed centrally and extending through the drum 44 along the second axis B. The outside surface 50 of the drum 44 defines a plurality of drum teeth 56 extending radially from the outside surface 50 to a first diameter.

The clutch subassembly 42 also includes a hub 46 having a cup shape that is nested in the drum 44 and includes a rim 58 and an inner surface 60 and an outer surface 62 and is rotatable about the second axis B. The hub 46 is disposed in a spaced relationship to the drum 44 and includes a flange 64 (FIG. 3) attached to and extending radially from the rim 58. The hub 46 also includes a sleeve 66 having a generally cylindrical shape and an exterior and defines a bore 68 disposed centrally and extending through the sleeve 66 along the second axis B. The sleeve 66 of the hub 46 is annularly disposed about the second axis B and extends through the hub 46 and through the opening 54 of the drum 44. The exterior of the sleeve 66 defines a plurality of hub teeth 70 extending radially from the exterior to a second diameter which is smaller than the first diameter. The hub teeth 70 mesh with the rack teeth 40 of the rack 26 for moving the rack 26 along the first axis A in response to rotation of the hub 46 about the second axis B. The sleeve 66 defines a recess 72 at each end of the bore 68.

Figure 3:
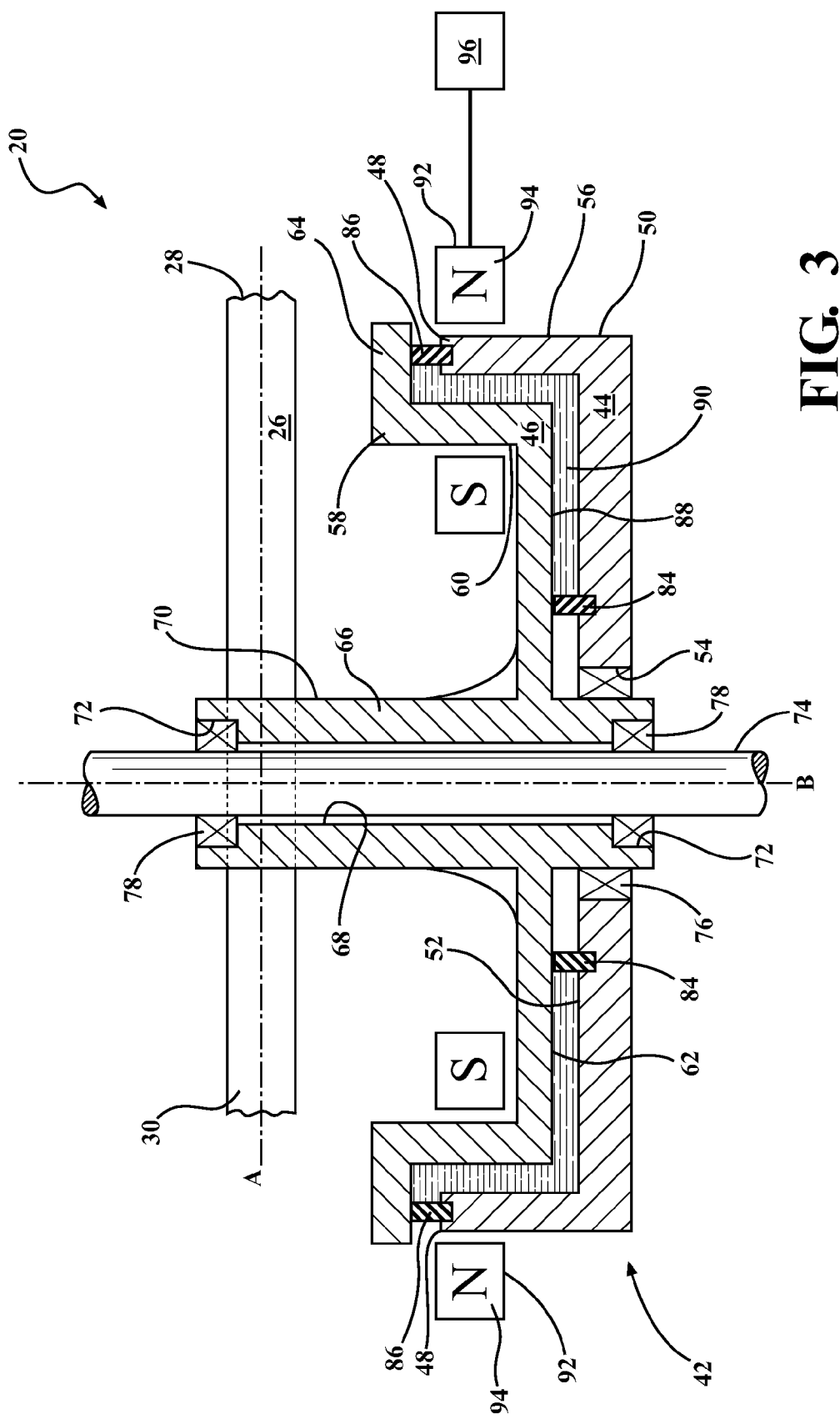
FIG. 3 is a cross-sectional view of the brake booster assembly taken along line 3-3 of FIG. 2 and illustrates a drum and a hub of the clutch subassembly.

As best shown in FIG. 3, a shaft 74 extends through the sleeve 66 along the second axis B for supporting the clutch subassembly 42. At least one drum bearing 76 is disposed in the opening 54 of the drum 44 and is annularly disposed about the sleeve 66 of the hub 46 for reducing friction as the drum 44 rotates relative to the hub 46. Likewise, at least one hub bearing 78 is disposed in each of the recesses 72 and annularly disposed about the shaft 74 for reducing friction as the hub 46 rotates relative to the shaft 74. It should be understood that various types of bearings may be used, such as but not limited to ball bearings, roller bearings, or thrust bearings.

Figure 2:
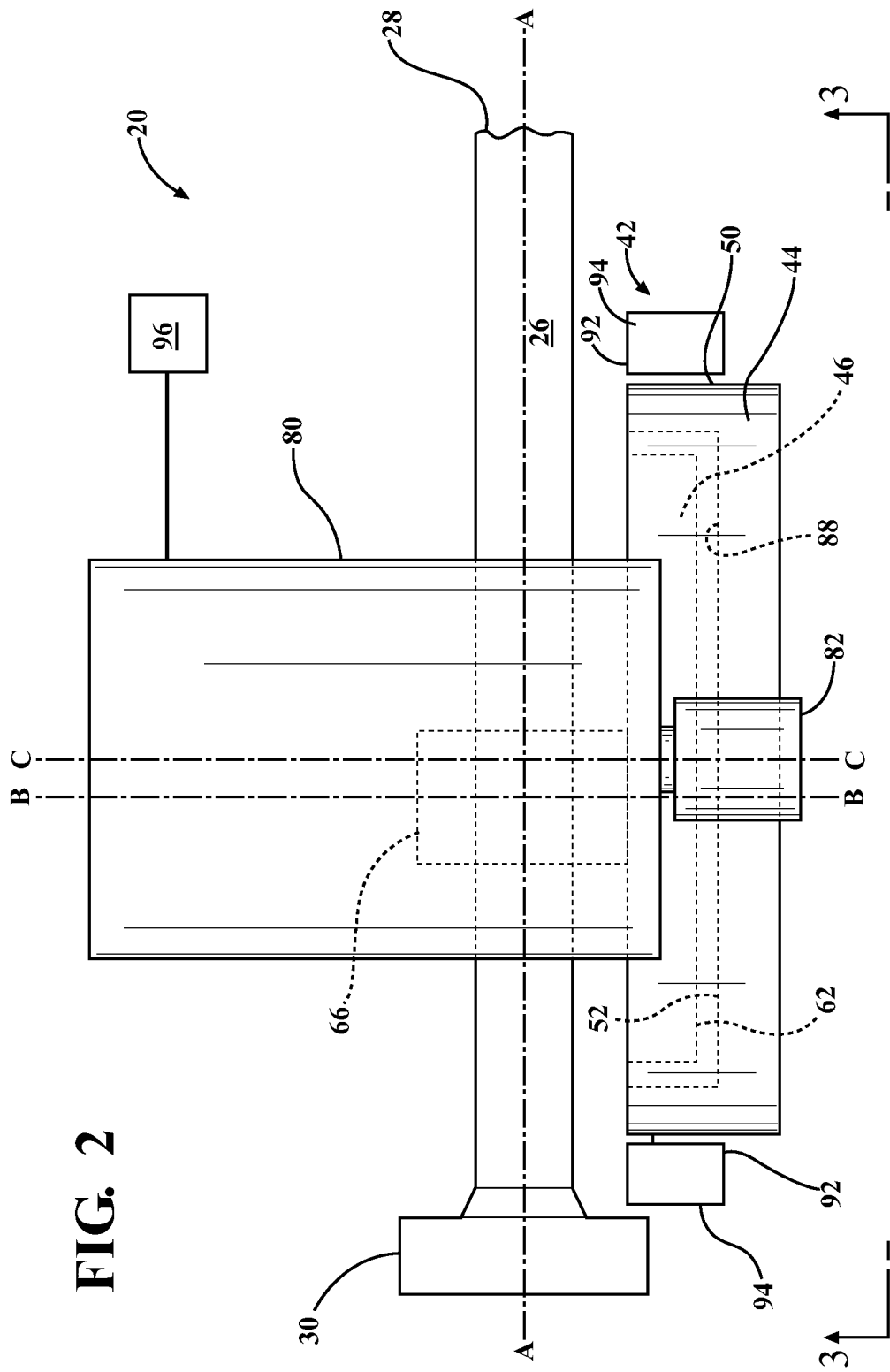
FIG. 2 is a top view of the brake booster assembly illustrating a motor disposed adjacent to a rack and a clutch subassembly.

A motor 80 is disposed adjacent to the rack 26 and has an axle that is rotatable about and extends along a third axis C generally parallel to the second axis B (FIG. 2). Although the third axis C is generally parallel to the second axis B in the preferred embodiment, it should be appreciated that other orientations of the axes A, B, C and configurations of the motor 80, drum 44, hub 46, and rack 26 may be alternatively used. The motor 80 is operably connected to the clutch subassembly 42. Specifically, a pinion gear 82 is attached to the axle of the motor 80 and has a plurality of pinion teeth meshed with the drum teeth 56 for rotating the drum 44 about the second axis B in response to the axle and pinion gear 82 rotating about the third axis C. Because the first diameter of the drum 44 is larger than the second diameter of the hub 46, a single revolution the drum 44 will result in a small movement of the rack 26 (i.e. there is a gear reduction). Consequently, the difference in first diameter as compared to the second diameter also results in an increase of torque from the drum 44 to the hub 46. Although the second diameter is less than the first diameter in the preferred embodiment of the invention, it should be appreciated that other arrangements or gearing may be used to provide the appropriate amount of movement of the rack 26 as a result of movement of the axle of the motor 80.

As illustrated in FIG. 3, the clutch subassembly 42 also includes a first seal 84 and a second seal 86. The first seal 84 is annularly disposed about the second axis B between the drum 44 and the hub 46 of the clutch subassembly 42 and is attached to the drum 44 and sealingly engages the outer surface 62 of the hub 46. The second seal 86 is annularly disposed about the second axis B between the drum 44 and the hub 46 and is attached to the lip 48 of the drum 44 and sealingly engages the flange 64 of the hub 46. It should be understood that various sealing arrangements may be used, such as but not limited to slide rings and O-rings. The outer surface 62 and the flange 64 of the hub 46 and the inside surface 52 of the drum 44 and the first seal 84 and the second seal 86 define a chamber 88. A magnetorheological fluid 90 is disposed in the chamber 88 and the seals 84, 86 seal the magnetorheological fluid 90 between the hub 46 and the drum 44.

The clutch subassembly 42 further includes a mount 92 which is disposed about the outside surface 50 of the drum 44 and the inner surface 60 of the hub 46. An electromagnet 94 is disposed on the mount 92 for generating an electromagnetic field to affect viscosity of the magnetorheological fluid 90 in the chamber 88. The electromagnet 94 may take the form of a coil to produce a controlled magnetic field, however, it should be appreciated that other structures for providing a controlled magnetic field may be used alternatively. It should also be understood that the mount 92 and electromagnet 94 may be arranged in other orientations to the hub 46 and drum 44 to affect the viscosity of the magnetorheological fluid 90 contained in the chamber 88. Changes in viscosity of the magnetorheological fluid 90 in turn allow a varying amount of torque to be transferred from the drum 44 of the clutch subassembly 42 (i.e. clutch input) to the hub 46 of the clutch subassembly 42 (i.e. clutch output). A controller 96 is electrically connected to the electromagnet 94 and to the sensor 34 and to the motor 80 for controlling rotation of the axle of the motor 80 and the electromagnetic field of the electromagnet 94 in response to the signal from the sensor 34. In one embodiment, the motor 80 can be controlled to operate at an optimum speed and then the controller 96 can control the electromagnetic field of the electromagnet 94 as needed to move the rack 26.

Because of the direct mechanical coupling from the brake pedal 24 through the rack 26, to the push rod 36, the brake booster assembly 20 will continue to function without electrical power. Under conditions when the electromagnet 94 is not energized or if the brake booster assembly 20 loses electrical power, the magnetorheological fluid 90 will behave in a Newtonian manner, meaning that the brake booster assembly 20 can still operate as a "non-boosted" manual brake system and force applied through the brake pedal 24 will still be applied to the master cylinder 22. Therefore, the brake booster assembly 20 functions without electrical power in a similar fashion to the function of brake vacuum pressure based boosters when there is a loss of vacuum pressure. Consequently, the brake booster assembly 20 would have an advantage over purely "brake-by-wire" systems by meeting existing vehicle safety standards requirements which dictate fail-safe operation.

Figure 4:
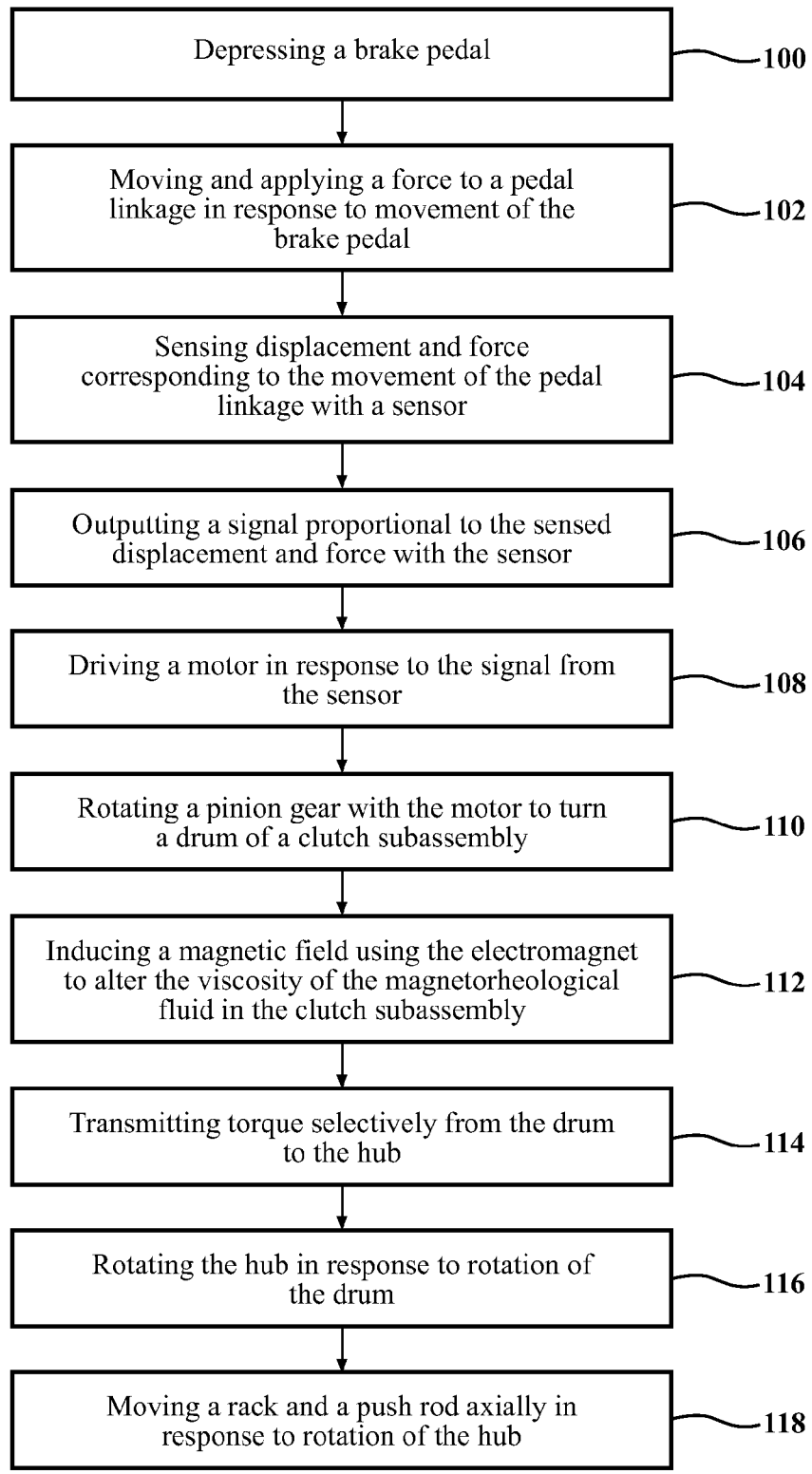
FIG. 4 is a flow chart illustrating the steps of operating an embodiment the brake booster assembly.

As illustrated by a flow chart in FIG. 4, a method of operating a brake booster assembly 20 is also disclosed. The method includes the steps of 100 depressing the brake pedal 24 and 102 moving and applying a force to the pedal linkage 32 in response to movement of the brake pedal 24. The method progresses by 104 sensing displacement and force corresponding to the movement of the pedal linkage 32 with the sensor 34. The next step is 106 outputting a signal proportional to the sensed displacement and force with the sensor 34. Next, 108 driving the motor 80 in response to the signal from the sensor 34 (i.e. sensed displacement and force) and 110 rotating the pinion gear 82 with the motor 80 to turn the drum 44 of the clutch subassembly 42. Then, the next step is 112 inducing a magnetic field using the electromagnet 94 to alter the viscosity of the magnetorheological fluid 90 in the clutch subassembly 42. The method proceeds by 114 transmitting torque selectively from the drum 44 to the hub 46 (i.e. through the magnetorheological fluid 90). This results in 116 rotating the hub 46 in response to rotation of the drum 44. The method concludes by 118 moving the rack 26 and push rod 36 axially in response to rotation of the hub 46.

When the driver releases the brake pedal 24, partially or completely, the clutch subassembly 42 and motor 80 may be controlled to allow the retraction of the push rod 36 due to the force of the return spring 38. However, the clutch subassembly 42 and motor 80 may also be controlled to actively assist the retraction of the push rod 36 from the master cylinder 22. In other words the direction of the motor 80 may be reversed and torque transferred from the drum 44 to the hub 46 to actively move the rack 26 away from the master cylinder 22 and toward the pedal linkage 32.

The brake booster assembly 20 as disclosed is able to react and provide boost or brake assist in fractions of a second. Because of this, the brake booster assembly 20 could be used to apply varying pressure pulses to the master cylinder 22 and to the rest of the brake system in much the same way that Anti-lock Braking Systems (ABS) delivers pressure pulses to the brakes at each wheel. These pressure pulses could be achieved by using the controller 96 of the brake booster assembly 20 to switch the electrical power to the electromagnet 94 at a high rate (e.g. period of approximately 20 ms) or frequency while maintaining electrical current to the motor 80. Therefore, the brake booster assembly 20 could be used to reduce the weight of a braking system by taking the place of brake system components generally used for ABS such as, but not limited to an ABS pump.

Additionally, the brake booster assembly 20 can provide brake actuation without driver input through the brake pedal 24. Thus, the brake booster assembly 20 could be coupled with other systems already existing in a vehicle such as, but not limited to object proximity systems (e.g. Active Cruise Control), theft detection systems, parking brake, or "Hill-hold" features. These systems generally actuate the braking system without driver input, so the brake booster assembly 20 may be used to assist the operation of or replace components of these systems.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A brake booster assembly comprising:
a rack moveable along a first axis,
at least one sensor coupled with said rack for sensing force and axial displacement of said rack and outputting a signal proportional to the sensed force and the sensed displacement,
a clutch subassembly disposed adjacent and coupled to said rack and including a drum and a hub in a spaced relationship with said drum,
a motor disposed adjacent said rack and coupled to said clutch subassembly for rotating said drum,
a magnetorheological fluid disposed between said drum and said hub,
an electromagnet disposed about said clutch subassembly for generating an electromagnetic field to affect the viscosity of said magnetorheological fluid, and
a controller electrically connected to said electromagnet and to said sensor and to said motor for controlling said motor and the electromagnetic field of said electromagnet in response to the signal from said sensor.

2. A brake booster assembly as set forth in claim 1 said drum of said clutch subassembly extends along and is rotatable about a second axis transverse to said first axis and has an outside surface defining a plurality of drum teeth extending radially from said outside surface.

3. A brake booster assembly as set forth in claim 2 wherein said motor includes an axle rotatable about and extending along a third axis generally parallel to the second axis and attached to a pinion gear having a plurality of pinion teeth meshed with said drum teeth for rotating said drum about said second axis.

4. A brake booster assembly as set forth in claim 3 wherein said rack has a plurality of rack teeth extending from said rack and said hub of said clutch subassembly includes a sleeve having an exterior defining a plurality of hub teeth extending radially from said exterior and meshed with said rack teeth for moving said rack along said first axis in response to rotation of said clutch subassembly.

5. A brake booster assembly as set forth in claim 4 wherein said drum teeth extend radially to a first diameter and said plurality of hub teeth extend radially to a second diameter being smaller than said first diameter for providing an increase in torque from said drum to said hub.

6. A brake booster assembly as set forth in claim 5 wherein said drum defines an opening disposed centrally and extending therethrough along said second axis and said sleeve of said hub is annularly disposed about said second axis and extends through said hub and through said opening of said drum.

7. A brake booster assembly as set forth in claim 6 wherein said hub has a cup shape and is nested in said drum and includes a rim and an inner surface and an outer surface and is rotatable about said second axis and includes a flange attached to and extending radially from said rim and said clutch subassembly further includes a first seal annularly disposed about said second axis between said drum and said hub and sealingly engages said outer surface of said hub and a second seal annularly disposed about said second axis between said drum and said hub and attached to a lip of said drum and sealingly engaging said flange of said hub for sealing said magnetorheological fluid between said hub and said drum.

8. A brake booster assembly as set forth in claim 7 further including a mount disposed about said outside surface of said drum and said inner surface of said hub and wherein said electromagnet is disposed on said mount.

9. A brake booster assembly comprising:
a rack moveable along a first axis and having an a plurality of rack teeth extending from said rack,
at least one sensor coupled with said rack for sensing force and axial displacement of said rack and outputting a signal proportional to the sensed force and the sensed displacement,
a clutch subassembly disposed adjacent said rack and including a drum and a hub,
said drum of said clutch assembly having an outside surface defining a plurality of drum teeth extending radially from said outside surface,
said hub including a sleeve having an exterior defining a plurality of hub teeth extending radially and meshed with said rack teeth for moving said rack along said first axis in response to rotation of said hub,
a motor disposed adjacent said rack and coupled to a pinion gear having a plurality of pinion teeth meshed with said drum teeth for rotating said drum, and
a controller electrically connected to said sensor and to said motor and operably connected to said clutch subassembly for controlling movement of said rack in response to the signal from said sensor.

10. A brake booster assembly as set forth in claim 9 wherein said hub of said clutch subassembly is disposed in a spaced relationship to said drum and a magnetorheological fluid is disposed therebetween and said brake booster assembly further includes an electromagnet electrically connected to said controller and disposed about said clutch subassembly for generating an electromagnetic field to affect the viscosity of said magnetorheological fluid.

11. A brake booster assembly as set forth in claim 10 wherein said hub has a cup shape and is nested in said drum and includes a rim and an inner surface and an outer surface and is rotatable about said second axis and includes a flange attached to and extending radially from said rim and said clutch subassembly further includes a first seal annularly disposed about said second axis between said drum and said hub and sealingly engages said outer surface of said hub and a second seal annularly disposed about said second axis between said drum and said hub and attached to said lip of said drum and sealingly engages said flange of said hub for sealing said magnetorheological fluid between said hub and said drum.

12. A brake booster assembly as set forth in claim 9 wherein said drum is disposed about and extends along a second axis transverse to said first axis and is rotatable about said second axis and said drum defines an opening disposed centrally and extending therethrough along said second axis and said sleeve of said hub is annularly disposed about said second axis and extends through said hub and through said opening of said drum.

13. A brake booster assembly as set forth in claim 12 wherein said sleeve defines a bore disposed centrally and extending through said sleeve along said second axis and said brake booster assembly further including a shaft extending through said bore of said sleeve along said second axis for supporting said clutch subassembly.

14. A brake booster assembly as set forth in claim 13 wherein said sleeve of said hub defines a recess at each end of said bore and said brake booster assembly further includes at least one hub bearing disposed in each of said recesses and annularly disposed about said shaft for reducing friction as said hub rotates relative to said shaft.

15. A brake booster assembly as set forth in claim 12 further including at least one drum bearing disposed in said opening of said drum and annularly disposed about said sleeve of said hub for reducing friction as said drum rotates relative to said hub.

16. A brake booster assembly as set forth in claim 9 wherein said drum teeth extend radially to a first diameter and said plurality of hub teeth extend radially to a second diameter being smaller than said first diameter for providing a an increase in torque from said drum to said hub.

17. A brake booster assembly as set forth in claim 9 wherein said axle of said motor is rotatable about and extends along a third axis generally parallel to said second axis.

18. A method of operating a brake booster assembly comprising the steps of:
depressing a brake pedal,
moving and applying a force to a pedal linkage in response to movement of the brake pedal,
sensing displacement and force corresponding to the movement of the pedal linkage with a sensor,
outputting a signal proportional to the sensed displacement and force with the sensor,
driving a motor in response to the signal from the sensor,
rotating a drum of a clutch subassembly with the motor,
transmitting torque selectively from the drum to a hub of the clutch subassembly,
wherein the step of transmitting torque selectively from the drum to the hub of the clutch subassembly is further defined as inducing a magnetic field using an electromagnet to alter the viscosity of a magnetorheological fluid in the clutch subassembly, and
moving a rack and a push rod axially in response to rotation of the hub.

19. The method as set forth in claim 18 wherein the step of rotating the drum of the clutch subassembly with the motor is further defined as rotating a pinion gear with the motor to turn the drum of the clutch subassembly.

* * * * *